(12) United States Patent
Diallo et al.

(10) Patent No.: US 6,707,650 B2
(45) Date of Patent: Mar. 16, 2004

(54) SELF-SYNCHRONIZED SYNCHRONOUS RECTIFIER

(75) Inventors: Almadidi Diallo, Thorigne-Fouillard (FR); Philippe Puisieux, Lannion (FR); Patrick Ceunebrock, Pleumeur Bodou (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/141,872

(22) Filed: May 10, 2002

(65) Prior Publication Data

US 2002/0196002 A1 Dec. 26, 2002

(30) Foreign Application Priority Data

Jun. 25, 2001 (FR) .............................. 01 08336
Nov. 15, 2001 (FR) .............................. 01 14792

(51) Int. Cl.$^7$ ................................. H02H 7/00
(52) U.S. Cl. ........................ 361/18; 361/18
(58) Field of Search .................. 361/18, 19, 21, 361/56, 91.1, 16, 17

(56) References Cited

U.S. PATENT DOCUMENTS

| 5,590,032 | A |   | 12/1996 | Bowman et al. |
|-----------|---|---|---------|---------------|
| 5,663,877 | A | * | 9/1997  | Dittli et al. ............... 363/127 |
| 5,708,571 | A | * | 1/1998  | Shinada ..................... 363/16 |
| 5,828,558 | A |   | 10/1998 | Korcharz et al. |
| 5,870,299 | A | * | 2/1999  | Rozman ..................... 363/127 |
| 6,021,059 | A |   | 2/2000  | Kennedy |
| 6,038,148 | A |   | 3/2000  | Farrington et al. |
| 6,181,579 | B1| * | 1/2001  | Nagai et al. ............. 363/21.06 |
| 6,292,380 | B2|   | 9/2001  | Diallo et al. |

FOREIGN PATENT DOCUMENTS

| DE | 37 27 170 A1 | 2/1989 |
| DE | 39 27 734 A1 | 3/1991 |
| DE | 200 02 608 U1 | 9/2000 |
| EP | 1 052 763 A1 | 11/2000 |
| EP | 1 104 084 A2 | 5/2001 |
| WO | WO 95/02917 A1 | 1/1995 |

OTHER PUBLICATIONS

Patent Abstracts of Japan, vol. 1997, No. 12, Dec. 25, 1997 & JP 09 224371 A (Nippon Telegraph & Telephone Corp.) Aug. 26, 1997.

\* cited by examiner

Primary Examiner—Gregory J. Toatley, Jr.
Assistant Examiner—Danny Nguyen
(74) Attorney, Agent, or Firm—Sughrue Mion, PLLC

(57) ABSTRACT

A power MOSFET gate protection circuit includes a limiter having a low voltage conduction threshold controlled by its own wiring and including a first portion connected in parallel with a divider and adapted to be connected to the gate of an associated power MOSFET and a second portion adapted to be connected to the source of the associated power MOSFET.

12 Claims, 5 Drawing Sheets

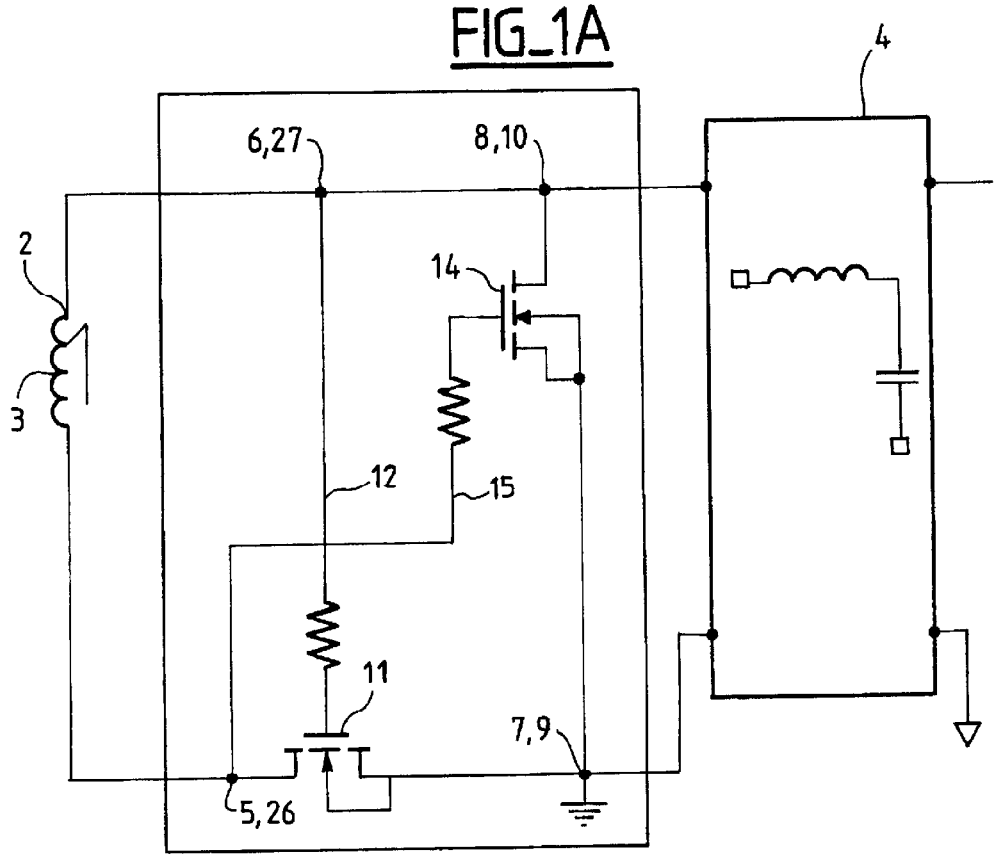
FIG_1A
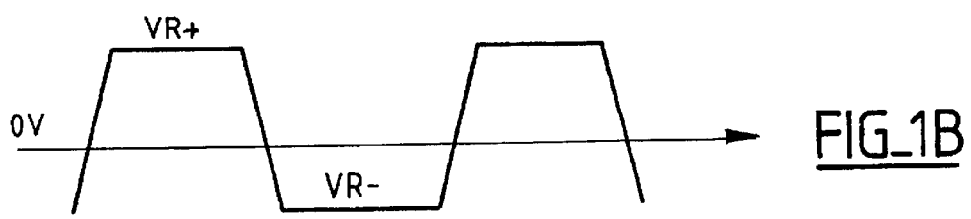
FIG_1B
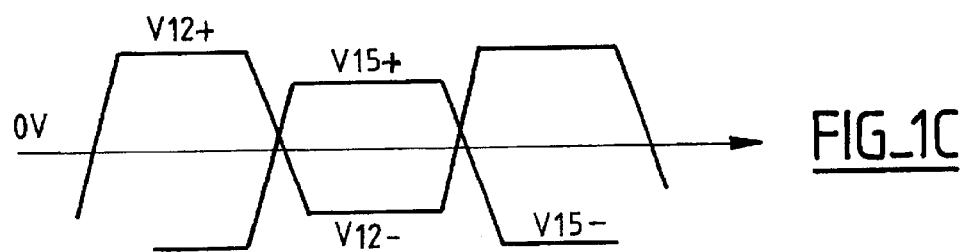
FIG_1C

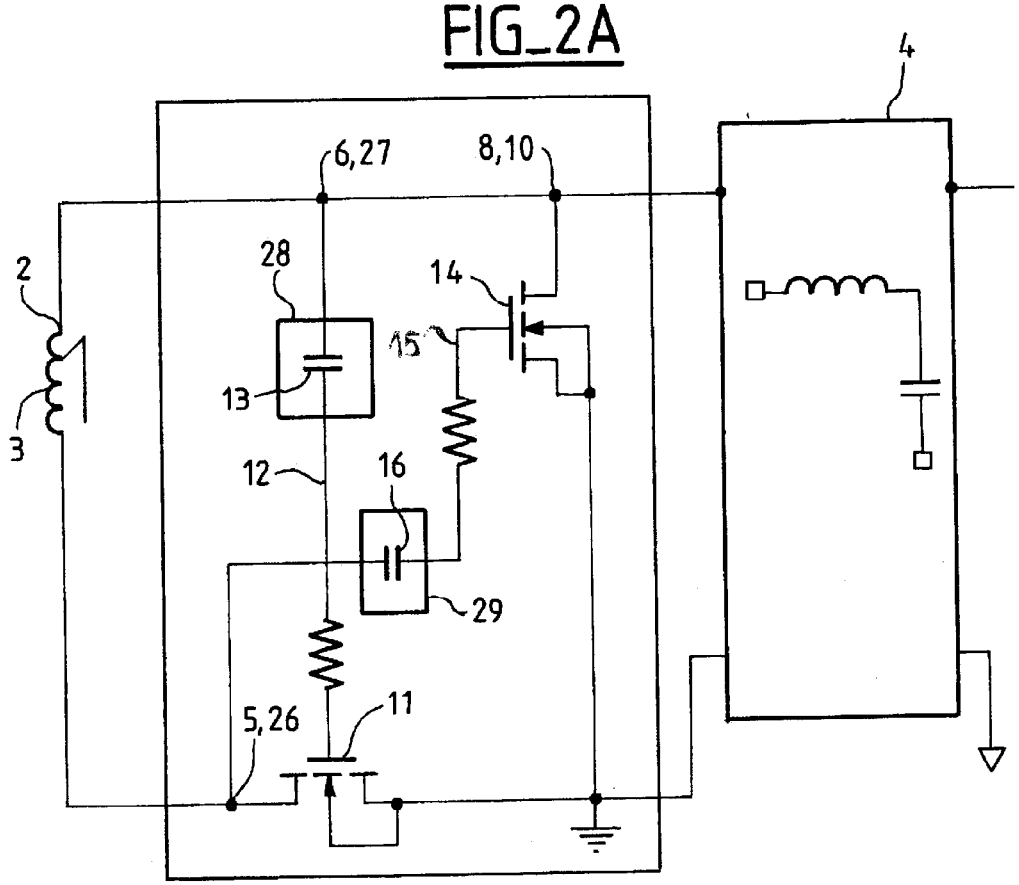
FIG_2A
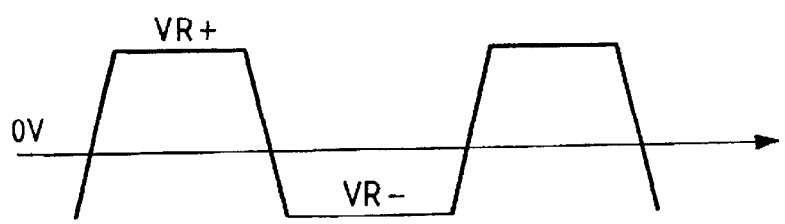
FIG_2B
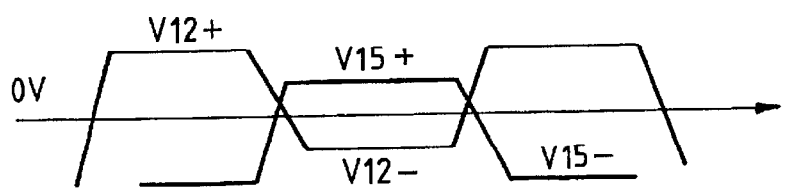
FIG_2C

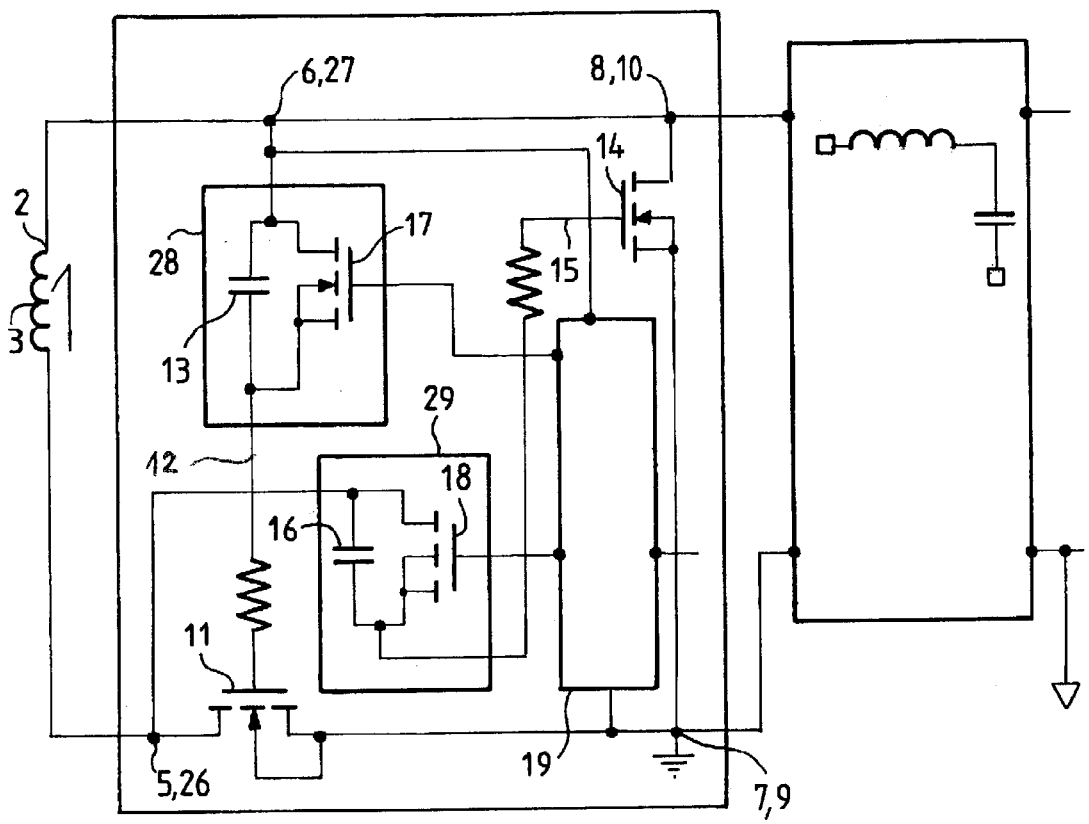
FIG_3A
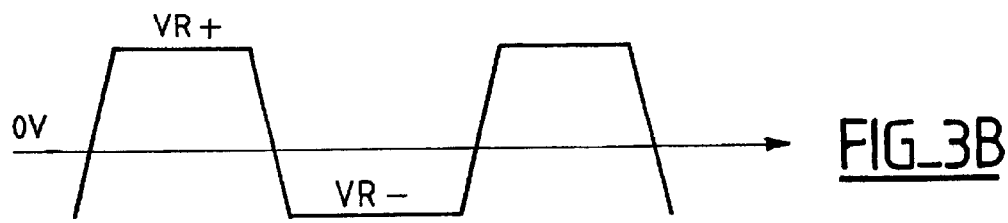
FIG_3B
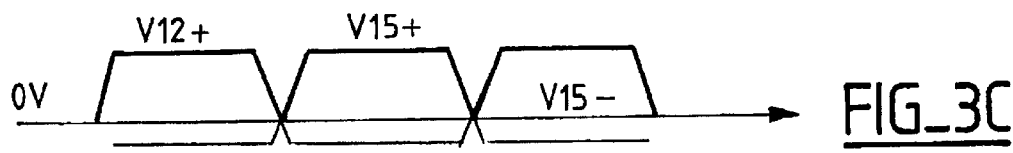
FIG_3C

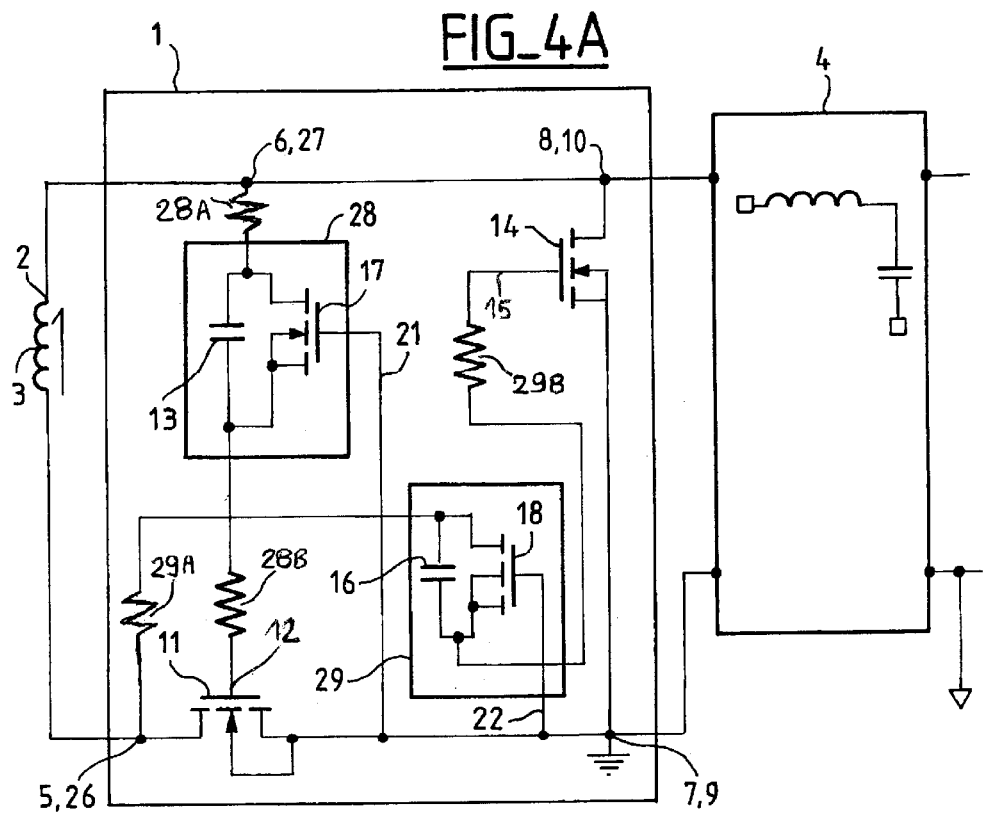
FIG_4A
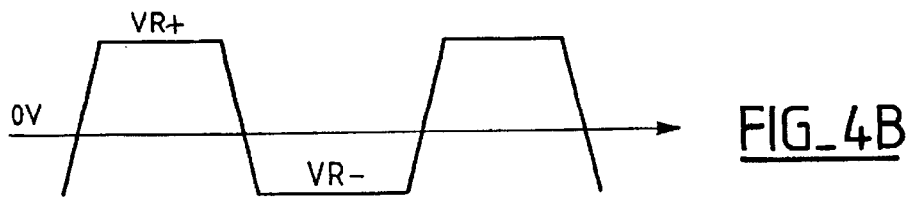
FIG_4B
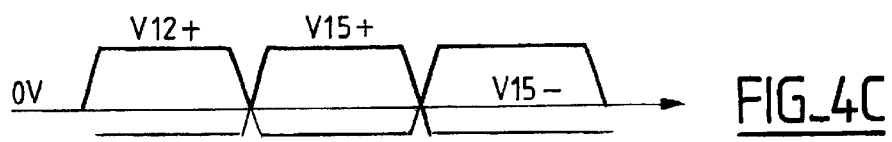
FIG_4C

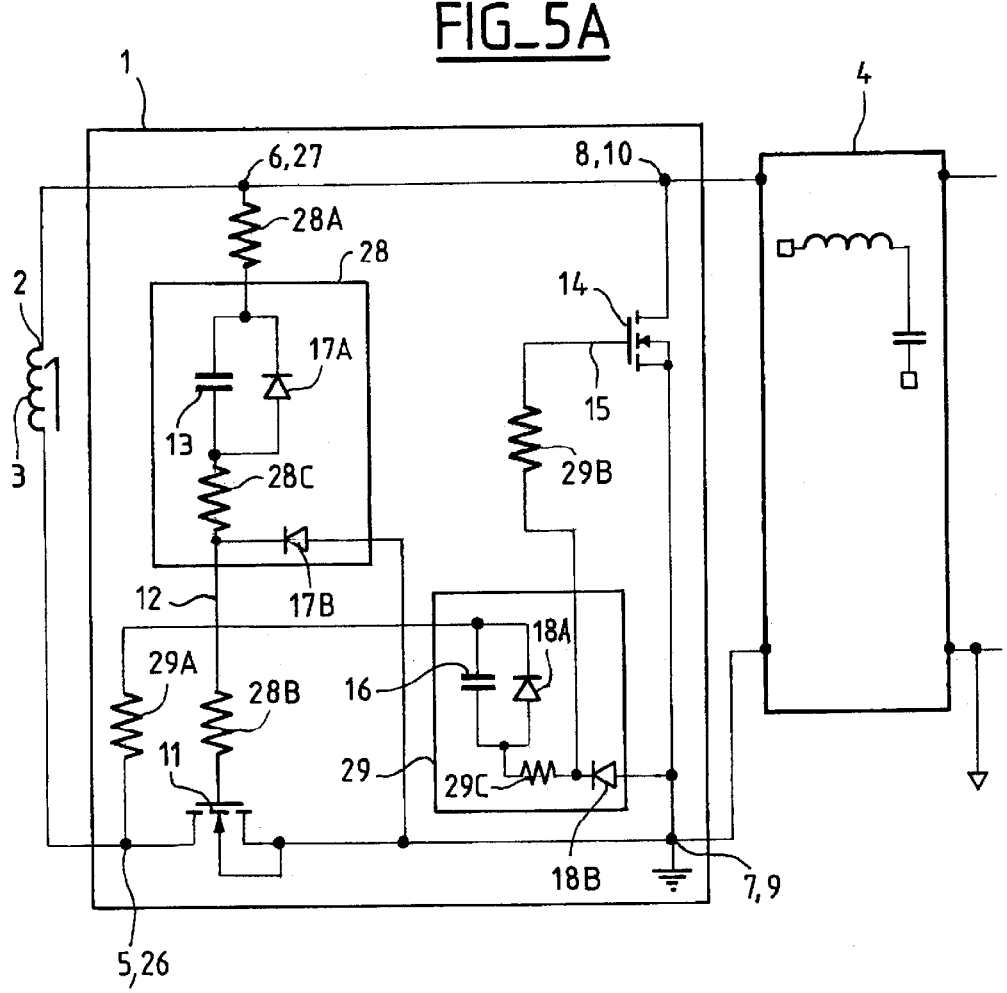
FIG_5A
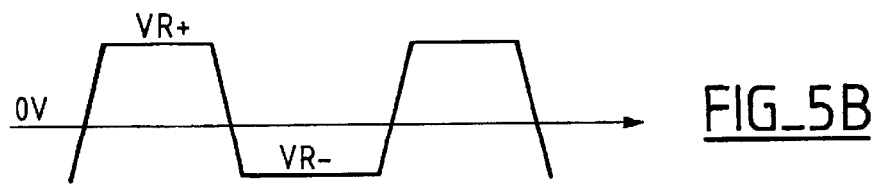
FIG_5B
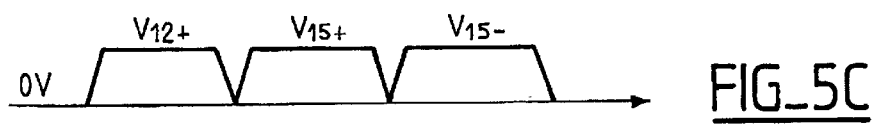
FIG_5C

SELF-SYNCHRONIZED SYNCHRONOUS RECTIFIER

CROSS-REFERENCE TO RELATED APPLICATIONS

This application is based on French Patent Application No. 01 14 792 filed Nov. 15, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a self-synchronized synchronous rectifier, in particular a self-synchronized synchronous rectifier used in an AC/DC or DC/DC converter.

The invention relates to a symmetrical or asymmetrical coupled winding synchronized or self-synchronized forward energy transfer synchronous rectifier. In the remainder of the text, the expression "self-synchronized synchronous rectifier" also refers to a "coupled winding synchronized synchronous rectifier".

2. Description of Related Art

Asymmetrical converter systems comprising an initial voltage source feeding a transformer primary connected in series with a main switch are known in the art. The transformer secondary is connected in cascade with a self-synchronized synchronous rectifier and a filter. The output of the filter delivers a controlled DC voltage to a load. In this type of converter system, the self-synchronized synchronous rectifier has the following functions:

- delivering to the load, via the filter, the energy transferred by the transformer in the periods of conduction of the main switch, and
- blocking the transfer in the periods of non-conduction of the main switch, the load being supplied with power by the coil of the filter during periods of non-conduction of the main switch.

An asymmetrical self-synchronized synchronous rectifier comprises two MOSFETs adapted to provide the above two functions to reduce the losses of the rectifier. For example, an asymmetrical self-synchronized synchronous rectifier includes:

- first and second rectifier outputs,
- a first MOSFET connected between the first transformer secondary end and the first rectifier output and having a gate connection to the second end of the transformer secondary, and
- a second MOSFET connected between the first rectifier output and the second rectifier output and having a gate connection to the first end of the transformer secondary.

The voltage at the secondary of the transformer controls the two MOSFETs.

For economic reasons, and to obtain a small overall size, manufacturers wish to develop converters offering, in the same product, a wide range of input voltage and varied output voltages. This implies a high operating frequency and voltage variations at the secondary of the transformer proportional to those at the input. The voltage at the secondary of the transformer also constitutes the gate signal of the MOSFETs of the rectifier. The voltage that can be applied to the gates of the MOSFETs is limited. If too high a voltage is applied to the gate of a MOSFET, it may be destroyed or generate unacceptable switching losses. These losses are proportional to the switching frequency.

To protect MOSFETs against gate overvoltages, it is known in the art for the gate connections to be in series with a passive voltage divider bridge. However, the presence of the voltage divider causes high losses if the voltage at the secondary of the transformer is too low or too high. This solution also has the drawback of significant switching losses associated with the reverse bias voltages of the synchronous rectifier MOSFETs.

A self-synchronized synchronous rectifier can be envisaged having gate protection allowing a wide variation in the input voltage combined with optimum performance in terms of output current and voltage.

A prior art solution provides an asymmetrical self-synchronized synchronous rectifier connected between a transformer secondary winding, having first and second transformer ends and an LC filter having first and second filter inputs, said asymmetrical self-synchronized synchronous rectifier including:

- first and second rectifier inputs respectively connected to the first and second transformer ends,
- a first rectifier output and a second rectifier output which is connected to the second rectifier input and to an input filter,
- a forward MOSFET connected between the first rectifier input and the first rectifier output and having a gate connection connected to the second rectifier input through a gate protection circuit, and
- a freewheel MOSFET connected between the first rectifier output and the second rectifier output and having a gate connection connected to the first rectifier input through a gate protection circuit.

Here, each gate protection circuit constitutes, with the intrinsic or additional gate-source capacitance of the corresponding MOSFET, a controlled divider bridge, and the rectifier includes a control device receiving an input signal proportional to the input voltage of the rectifier and producing output signals for controlling the gate protection circuits. It is usual to provide low impedances in series with the gate protection circuit, which does not alter the general principle described.

The advantages of this kind of solution result from dynamic control of the gate voltage, which enables the voltage divider bridge to be short-circuited or not, as a function of the voltage of the secondary of the transformer or any voltage equivalent to the input voltage. Accordingly, regardless of the amplitude of the input voltage of the self-synchronized synchronous rectifier, the gate voltages of the MOSFETs are optimized to limit losses and conserve an optimum switching dynamic. Accordingly, for high variations of input voltage, and for the same output voltage and the same volume, a converter including a self-synchronized MOSFET rectifier can pass more power.

However, although it is effective in reducing switching losses and conduction losses, this solution proves to be bulky and costly as soon as the range of input voltage is normal, and also for very low output voltages.

The present invention solves these problems, limiting the reverse voltage of the synchronous rectifier MOSFETs, in the phase in which they are turned off, to the conduction threshold voltage of a limiter, and at the same time assuring correct biasing of the gates in the respective phases in which the MOSFETs are turned on.

SUMMARY OF THE INVENTION

To this end, a power MOSFET gate protection circuit in accordance with the invention includes a limiter having a low voltage conduction threshold controlled by its own wiring and including a first portion connected in parallel with a divider and adapted to be connected to the gate of an associated power MOSFET and a second portion adapted to be connected to the source of the associated power MOSFET.

In a first embodiment of the invention the limiter is a transistor controlled by its gate-source wiring, its source being adapted to be connected to the gate of the associated power MOSFET and the gate being adapted to be connected to the source of the associated power MOSFET.

The transistor is advantageously an MOS transistor.

In a second embodiment of the invention the limiter comprises a first diode connected in parallel with the divider component and adapted to be connected to the gate of the associated power MOSFET and a second diode adapted to be connected in parallel between the source and the gate of the associated power MOSFET.

The first diode is preferably a signal diode and the second diode is preferably a protection diode.

The invention also provides a self-synchronized synchronous rectifier adapted to be connected between a transformer secondary winding having first and second transformer ends and an LC filter having first and second filter inputs, the self-synchronized synchronous rectifier including:

first and second rectifier inputs respectively connected to the first and second transformer ends, a first rectifier output and a second rectifier output which is connected to the second rectifier input, a forward MOSFET, or any voltage-controlled component, connected between the first rectifier input and the first rectifier output and having a gate connection, and a freewheel MOSFET, or any voltage-controlled component, connected between the first rectifier output and the second rectifier output and having a gate connection, wherein at least one of the gate connections is connected to a rectifier input via a gate protection circuit which includes a limiter having a low voltage conduction threshold controlled by its own wiring, a first portion of the limiter is connected in parallel with a divider component and adapted to be connected to the gate of the associated power MOSFET and a second portion of the limiter is adapted to be connected to the source of the associated power MOSFET.

In a first embodiment of the invention the limiter is a transistor controlled by its gate-source wiring, the source is adapted to be connected to the gate of the associated power MOSFET, and the gate is adapted to be connected to the source of the associated power MOSFET.

The transistor is advantageously an MOS transistor.

In a second embodiment of the invention the limiter comprises a first diode connected in parallel with the divider and adapted to be connected to the gate of the associated power MOSFET and a second diode adapted to be connected in parallel between the source and the gate of the associated power MOSFET.

The first diode is preferably a signal diode and the second diode is preferably a protection diode.

The wiring of the limiter advantageously includes series impedances.

The protection circuit can be connected to the rectifier via a second divider in series with the first. The second divider can provide active gate protection, as shown in FIG. 3A.

The rectifier can be wired to a center-tapped transformer secondary.

The invention is described in more detail hereinafter with the assistance of figures showing a preferred embodiment of the invention.

BRIEF DESCRIPTION OF THE DRAWINGS

FIG. 1A is a schematic of the secondary of a first prior art embodiment of a self-synchronized synchronous rectifier and FIGS. 1B and 1C are corresponding voltage diagrams.

FIG. 2A is a schematic of the secondary of a second prior art embodiment of a self-synchronized synchronous rectifier with a capacitive divider and FIGS. 2B and 2C are corresponding voltage diagrams.

FIG. 3A is a schematic of the secondary of a third embodiment (co-invented by the present two inventors and a third co-inventor, and is the subject matter of U.S. Pat. No. 6,292,380) of a self-synchronized synchronous rectifier with active gate protection and FIGS. 3B and 3C are corresponding voltage diagrams.

FIG. 4A is a schematic of the secondary of a first embodiment of a self-synchronized synchronous rectifier according to the invention with active gate protection and FIGS. 4B and 4C are corresponding voltage diagrams.

FIG. 5A is a schematic of the secondary of a second embodiment of a self-synchronized synchronous rectifier according to the invention with active gate protection and FIGS. 5B and 5C are corresponding voltage diagrams.

DETAILED DESCRIPTION OF THE PREFERRED EMBODIMENTS

The control signals represented in all the above diagrams correspond to those obtained from rectification with active demagnetization. The only difference with resonant demagnetization is that the waveforms are different in the phase in which the freewheel MOSFET conducts.

In the following description, components common to the various embodiments are identified by the same reference numbers and, for clarity, the series impedances are treated as short circuits.

The invention concerns a symmetrical or asymmetrical self-synchronized synchronous rectifier.

The asymmetrical self-synchronized synchronous rectifier represented in the figures is between the secondary 2 of a transformer 3 and an LC filter 4.

To be more specific, the asymmetrical self-synchronized synchronous rectifier has first and second rectifier inputs 26, 27 connected to first and second transformer ends 5, 6 of the transformer secondary winding 3 and first and second rectifier outputs 9, 10 connected to first and second filter inputs 7, 8 of the LC filter 4. The second rectifier output 10 is connected to the second rectifier input 27.

The asymmetrical self-synchronized synchronous rectifier conventionally includes:

a forward MOSFET 11 connected between the first rectifier input 26 and the first rectifier output 9, with the gate connection 12 of the MOSFET 11 connected to the second rectifier input 27, and a freewheel MOSFET 14 connected between the first rectifier output 9 and the second rectifier output 10, with the gate connection 15 of the freewheel MOSFET 14 connected to the first rectifier input 26.

In the prior art embodiment shown in FIG. 1A, the gate connections 12, 15 have no protection circuitry.

The input voltage of the rectifier 1, shown in FIGS. 1B, . . . , 4B, has, depending on the topologies, diverse waveforms which in the forward phase, for convenience, can be treated as a squarewave signal VR whose duty cycle or frequency can be modulated and whose amplitude varies as a function of the voltage range chosen for the converter. The input voltage of the rectifier 1 is in fact the voltage from the secondary 2 of the transformer 3, and as well as supplying power to the load, it also serves as a control signal for the power MOSFETs 11, 14.

Consider the variable amplitude voltage VR shown in FIG. 1B at the terminals of the transformer 3: when it biases the gate 12 positive, the gate 15 is biased negative, and vice versa. Accordingly, in the respective conduction phases, the absolute value of the voltage V12+ at the gate 12 copies the absolute value of VR+ and the absolute value of the voltage V15+ at the gate 15 copies the absolute value of VR−. To a positive and maximum (or minimum) voltage VR+ at the gate 12 there corresponds a positive voltage VR− of minimum (or maximum) amplitude at the gate 15, as can be seen in FIG. 1C.

The control voltages are proportional to the image of the input voltage VR.

To protect the MOSFETs from a gate overvoltage, it is known in the art for the gate connections to be in series with a passive voltage divider bridge, as shown in FIG. 2A.

The gate connection 12 is connected in series with a gate protection circuit 28 comprising a capacitor 13 and the gate connection 15 is connected in series with a gate protection circuit 29 comprising a capacitor 16.

Consider the variable amplitude voltage VR shown in FIG. 2B at the terminals of the transformer 3: when it biases the gate 12 positive, the gate 15 is biased negative, and vice versa. Accordingly, in the respective conduction phases, the absolute value of the voltage V12+ at the gate 12 only copies a fraction of the absolute value of VR+ and the absolute value of the voltage V15+ at the gate 15 copies a fraction of the absolute value of VR−. To a positive and maximum (or minimum) voltage VR+ at the gate 12 there corresponds a positive voltage VR− of minimum (or maximum) amplitude at the gate 15, as can be seen in FIG. 2C.

The control voltages are therefore reduced at the gates by virtue of this protective arrangement with a capacitive divider, but optimization is difficult and with capacitive coupling high negative voltages are present.

In the embodiment shown in FIG. 3A, each gate protection circuit 28, 29 includes a divider 13, 16 connected in parallel with a switch 17, 18 having an open position and a closed position.

The divider 13, 16 constitutes, with the intrinsic capacitor or the impedance connected between the gate and the source of the MOSFET, a non-dissipative divider bridge.

Furthermore, the rectifier includes a control device 19 for controlling the switches 17, 18. The control device 19 receives an input signal proportional to the voltage at the input of the rectifier 1 and produces output signals for controlling the switches 17, 18.

The control device 19 further includes means for generating a threshold value and means for comparing the input signal with the threshold value. The output signals are a function of the direction of the comparison between the input signal and the threshold value.

Consider the variable amplitude voltage VR shown in FIG. 3B at the terminals of the transformer 3: when it biases the gate 12 positive, the gate 15 is biased negative, and vice versa. Accordingly, in the respective conduction phases, the absolute value of the voltage V12+ at the gate 12 copies the absolute value of VR+ or a fraction of VR+ and the absolute value of the voltage V15+ at the gate 15 copies the absolute value of VR− or a fraction of VR−. To a positive and maximum (or minimum) voltage VR+ there corresponds a fraction of VR+ (or the whole of the voltage VR+) at the gate 12. To a minimum (or maximum) voltage VR− there corresponds the whole of the positive voltage VR− (or a fraction of VR−) at the gate 15, as can be seen in FIG. 3C.

The voltages at the gates are therefore optimized with active control and with no significant negative voltage. This type of protection circuit is bulky and complex, however.

FIG. 4A shows a first embodiment of a rectifier according to the invention.

The self-synchronized synchronous rectifier 1 is connected between the secondary of a transformer 3 and an LC filter 4.

To be more specific, the asymmetrical self-synchronized synchronous rectifier 1 has first and second rectifier inputs 26, 27 connected to first and second transformer ends 5, 6 of the secondary winding 2 of the transformer 3 and first and second rectifier outputs 9, 10 connected to first and second filter inputs 7, 8 of the LC filter 4. The second rectifier output 10 is connected to the second rectifier input 27.

The self-synchronized synchronous rectifier conventionally includes:

a forward MOSFET 11 connected between the first rectifier input 26 and the first rectifier output 9, with the gate connection 12 of the MOSFET 11 connected to the second rectifier input 27 and the gate connection 12, whether including an impedance or not, connected in series with a voltage divider 13, and a freewheel MOSFET 14 connected between the first rectifier output 9 and the second rectifier output 10, with the gate connection 15 of the freewheel MOSFET 14 connected to the first rectifier input 26 and this gate connection 15, whether including an impedance or not, connected in series with a voltage divider 16.

According to the invention, each gate protection circuit 28, 29 includes a divider 13, 16 connected in parallel with an electronic switch 17, 18 having an open position and a closed position. The divider 13, 16 constitutes, with the intrinsic capacitor or the impedance placed between the gate and the source of the MOS transistor, a non-dissipative divider bridge.

The protection circuit can be connected to the rectifier via a second divider in series with the first.

In this first embodiment, the active device 17, 18 is a signal MOSFET whose gate 21, 22 is connected directly or through a low impedance to the common point of the sources of the power MOSFETs (here, point 7 of the rectifier 1). The active component 17, 18 is connected in parallel with the divider 13, 16, which can comprise a plurality of components connected in series, and the source of said active component is connected to the gates 12, 15 of the power MOSFETs 11, 14 via the impedance 28B and 29B. The active component 17 is associated with the forward MOSFET 11 and the active component 18 controls the gate of the freewheel MOSFET 14.

Each series impedance 28A, 28B, 29A, 29B can be replaced by a short circuit. In the remainder of the text the components 28A, 28B, 28C, 29A, 29B, 29C are treated as short circuits, but this does not affect the principle described.

The operation of the first embodiment of a rectifier according to the invention is as follows:

In the positive half-cycle of the signal VR, the forward MOSFET 11 is turned on and the freewheel MOSFET 14 is turned off. On the one hand, the active component 17 is turned off (its source 12 is at a higher voltage than its gate 21), which limits the positive voltage at the gate 12, if necessary, and, on the other hand, the gate of the freewheel MOSFET 14 tends to be biased negative, relative to its source, and drives the source of the signal MOSFET 18, which begins to conduct when its conduction threshold Vgth is reached.

In the negative half-cycle of the signal VR, the freewheel MOSFET 14 is turned on and the active component 18 is turned off, for limiting the positive voltage at the gate 15, if necessary. This is also the phase in which the forward MOSFET 11 is turned off, so its gate 12 tends to be biased negative, relative to its source, and drives the source of the signal MOSFET 17, which begins to conduct when its conduction threshold Vgth is reached. This soft switching of the signal MOSFETs 17, 18 limits the negative voltages at the gates 12, 15 of the MOSFETs 11, 14 to Vgth, regardless of the input voltage.

Consider the variable amplitude voltage VR shown in FIG. 4B at the terminals of the transformer 3: when it biases the gate 12 positive, the gate 15 is biased negative, and vice versa. Accordingly, in the respective conduction phases, the absolute value of the voltage V12+ at the gate 12 copies a fraction of the absolute value of VR+ and the absolute value of the voltage V15+ at the gate 15 copies a fraction of the absolute value of VR−.

To a positive and maximum (or minimum) voltage VR+ there corresponds a maximum (or minimum) fraction of VR+ at the gate 12. To a minimum (or maximum) voltage VR− there corresponds a minimum (or maximum) positive fraction of VR− at the gate 15. The reverse gate voltages V12− and V15− are negative but limited to Vgth, as can be seen in FIG. 4C.

FIG. 5A shows a second embodiment of a rectifier according to the invention.

Only the protection circuits 28 and 29 are different and described here.

According to the invention, each gate protection circuit 28, 29 includes a divider 13, 16 connected in parallel with a first diode 17A, 18A. The divider 13, 16 can comprise a plurality of components connected in series and constitutes, with the intrinsic capacitor or the impedance placed between the gate and the source of the MOS transistor, a non-dissipative divider bridge.

The protection circuit can be connected to the rectifier through a second divider in series with the first.

The first diode 17A, 18A is therefore connected by one of its terminals, directly or through a low impedance 28A, 29A, to the first or second transformer end 5, 6 and by the other of its terminals, directly or via the low impedances 28B, 28C, 29B, 29C, to the gate of the associated power MOSFET 11, 14.

The limiter also includes a second diode 17B, 18B connected, directly or through a low impedance 28B, 29B, in parallel between the source and the gate of the associated power MOSFET 11. The first diode 17A, 18A is preferably a signal diode and the second diode 17B, 18B is preferably a protection diode for limiting the forward voltage at the gate of the power MOSFETs 11, 14 under transient conditions.

Assuming that the series impedances 28A, 28B, 28C, 29A, 29B, 29C are negligible, the operation of this second embodiment of the rectifier is as follows:

In the positive half-cycle of the signal VR, the forward MOSFET 11 is turned on and the freewheel MOSFET 14 is turned off. On the one hand, the limiter 17A, 18B is turned off, which limits the positive voltage of the gate 12, if necessary, and, on the other hand, the gate of the freewheel MOSFET 14 tends to be biased negative, relative to its source, and drives the second diode 18B, which begins to conduct when its conduction threshold Vf is reached.

In the negative half-cycle of the signal VR, the freewheel MOSFET 14 is turned on and the limiter 18A, 18B is turned off, for limiting the positive voltage at the gate 15, if necessary. This is also the phase in which the forward MOSFET 11 is turned off, so its gate 12 tends to be biased negative, relative to its source, and drives the second diode 17B, which begins to conduct when its conduction threshold Vf is reached.

This switching of the diodes 17B and 18B limits the voltages at the gates 12, 15 of the MOSFETs 11, 14 to a voltage Vf equal to a forward diode voltage, regardless of the input voltage.

The conduction of the first diode 17A, 18A limits the voltage at the terminals of the divider 13, 16 to a threshold equal to a forward diode voltage.

Consider the variable amplitude voltage VR shown in FIG. 5B at the terminals of the transformer 3: when it biases the gate 12 positive, the gate 15 is biased negative, and vice versa. Accordingly, in the respective conduction phases, the absolute value of the voltage V12+ at the gate 12 copies a fraction of the absolute value of VR+ and the absolute value of the voltage V15+ at the gate 15 copies a fraction of the absolute value of VR−. To a positive and maximum (or minimum) voltage VR+ there corresponds a maximum (or minimum) fraction of VR+ at the gate 12. To a minimum (or maximum) voltage VR− there corresponds a positive minimum (or maximum) fraction of VR− at the gate 15. The reverse gate voltages V12− and V15− are negative but limited to Vf, as can be seen in FIG. 5C.

The invention described provides dynamic protection through natural switching of the diodes in the phase in which the power MOSFETs are turned off, substantially reducing switching losses, in particular those due to the simultaneous conduction that is inherent to self-synchronized synchronous rectification. The protection can apply to only one of the controlled power components.

Of course, the invention is not limited to the embodiments described and shown, but lends itself to many variants that do not depart from the scope of the invention and will be evident to the person skilled in the art. In particular, the synchronous rectifiers used can employ symmetrical or asymmetrical energy transfer. The switching components are wired in accordance with the rules of the MOSFET rectifier art using a symmetrical forward energy transfer topology.

The invention includes, in particular, all combined uses of the embodiments described, associated or not with all the prior art gate voltage divider means and all the prior art capacitive coupling means. Furthermore, either embodiment, or a combination of the two embodiments, can be applied to a single power component to be protected, or to both of them.

The gate connections of the active components 17, 18 can be connected to a reference different from the sources of the power MOSFETs 11, 14 (a voltage more negative than that at said sources, the output of an electronic gate, etc.). The presence of an appropriate impedance in these gate connections does not change the nature of the invention. Nor does parallel connection of the diodes at the terminals of the dividers 13, 16 or between the gate and source of the power component 11, 14.

The MOSFETs 11, 14 and the protection circuit 28, 29 can be connected to another winding of the same transformer or another transformer, simultaneously or separately.

These embodiments apply equally to a self-synchronized synchronous rectifier in which one of the power components is a diode.

What is claimed is:

1. A power MOSFET gate protection circuit including a limiter having a low voltage conduction threshold self-controlled by its own wiring and a first portion connected in parallel with a capacitive divider component and connected to the gate of an associated power MOSFET, and a second portion connected directly to the source of said associated power MOSFET, wherein said limiter comprises a transistor which is connected in parallel with said capacitive divider component, which is self-controlled by its gate-source wiring, whose source is connected to said gate of said associated power MOSFET, and whose gate is connected to said source of said associated power MOSFET, and wherein said capacitive divider component and the intrinsic gate-source capacitance of the associated power MOSFET connected in series form a capacitive divider bridge.

2. The protection circuit claimed in claim 1 wherein said transistor is an MOS transistor.

3. A power MOSFET gate protection circuit including a limiter having a low voltage conduction threshold self-controlled by its own wiring and a first portion connected in parallel with a capacitive divider component and connected to the gate of an associated power MOSFET, and a second portion connected directly to the source of said associated power MOSFET, wherein said limiter comprises a first diode connected in parallel with said capacitive divider component and connected to said gate of said associated power MOSFET, and a second diode connected in parallel between said source and said gate of said associated power MOSFET.

4. The protection circuit claimed in claim 3 wherein said first diode is a signal diode and said second diode is a protection diode.

5. A self synchronized synchronous rectifier adapted to be connected between a transformer secondary winding having first and second transformer ends and an LC filter having first and second filter inputs, said self-synchronized synchronous rectifier including:

first and second rectifier inputs respectively connected to said first and second transformer ends, a first rectifier output and a second rectifier output which is connected to said second rectifier input, a forward MOSFET, or any voltage-controlled component, connected between said first rectifier input and said first rectifier output and having a gate connection, and a freewheel MOSFET, or any voltage-controlled component, connected between said first rectifier output and said second rectifier output and having a gate connection, wherein at least one of said gate connections is connected to a rectifier input via a gate protection circuit which includes a limiter having a low voltage conduction threshold self-controlled by its own wiring, wherein a first portion of said limiter is connected in parallel with a first capacitive divider component and is connected to the gate of the associated power MOSFET, wherein a second portion of said limiter is connected directly to the source of said associated power MOSFET, wherein said limiter comprises a transistor which is self-controlled by its gate-source wiring, whose source is connected to said gate of said associated power MOSFET, and whose gate is connected to said source of said associated power MOSFET, and wherein the capacitive divider component and the transistor are connected in parallel, said capacitive divider component and the intrinsic gate-source capacitance of the associated power MOSFET connected in series forming a capacitive divider bridge.

6. The self-synchronized synchronous rectifier claimed in claim 5 wherein said transistor is an MOS transistor.

7. A self-synchronized synchronous rectifier adapted to be connected between a transformer secondary winding having first and second transformer ends and an LC filter having first and second filter inputs, said self-synchronized synchronous rectifier including:

first and second rectifier inputs respectively connected to said first and second transformer ends, a first rectifier output and a second rectifier output which is connected to said second rectifier input, a forward MOSFET, or any voltage-controlled component, connected between said first rectifier input and said first rectifier output and having a gate connection, and a freewheel MOSFET, or any voltage-controlled component, connected between said first rectifier output and said second rectifier output and having a gate connection, wherein at least one of said gate connections is connected to a rectifier input via a gate protection circuit which includes a limiter having a low voltage conduction threshold self-controlled by its own wiring, wherein a first portion of said limiter is connected in parallel with a first capacitive divider component and is connected to the gate of the associated power MOSFET, wherein a second portion of said limiter is connected directly to the source of said associated power MOSFET, wherein said limiter comprises a first diode connected in parallel with said divider and connected to said gate of said associated power MOSFET, and a second diode connected in parallel between the source and the gate of said associated power MOSFET.

8. The self-synchronized synchronous rectifier claimed in claim 7 wherein said first diode is a signal diode and said second diode is a protection diode.

9. The self-synchronized synchronous rectifier claimed in claim 7, wherein said wiring includes series impedances.

10. The self-synchronized synchronous rectifier claimed in claim 7, wherein said protection circuit is connected to said rectifier via a second capacitive divider component in series with the first capacitive divider component.

11. The self-synchronized synchronous rectifier claimed in claim 7, connected to a center-tapped transformer secondary.

12. The self-synchronized synchronous rectifier claimed in claim 7, comprising a power component which is a diode.

* * * * *